US008434916B2

(12) United States Patent
Craw et al.

(10) Patent No.: US 8,434,916 B2
(45) Date of Patent: *May 7, 2013

(54) LIGHTING AND VENTILATING APPARATUS AND METHOD

(75) Inventors: Gary J. Craw, Delafield, WI (US); Daniel L. Karst, Beaver Dam, WI (US)

(73) Assignee: Broan NuTone, LLC, Hartford, WI (US)

( * ) Notice: Subject to any disclaimer, the term of this patent is extended or adjusted under 35 U.S.C. 154(b) by 314 days.

This patent is subject to a terminal disclaimer.

(21) Appl. No.: 12/277,327

(22) Filed: Nov. 25, 2008

(65) Prior Publication Data

US 2009/0073702 A1 Mar. 19, 2009

Related U.S. Application Data

(63) Continuation of application No. 11/707,244, filed on Feb. 13, 2007, now Pat. No. 7,455,432, which is a continuation of application No. 10/714,367, filed on Nov. 14, 2003, now Pat. No. 7,175,309.

(51) Int. Cl.
*B60Q 1/06* (2006.01)
*F21V 29/00* (2006.01)

(52) U.S. Cl.
USPC ............ 362/373; 362/149; 362/294; 362/365

(58) Field of Classification Search .................. 362/149, 362/253, 294, 345, 373, 364–364
See application file for complete search history.

(56) References Cited

U.S. PATENT DOCUMENTS

| | | |
|---|---|---|
| 1,722,825 A | 7/1929 | Roethel |
| 2,189,008 A | 2/1940 | Kurth |
| 2,562,600 A | 7/1951 | Cadwell et al. |
| 3,010,378 A | 11/1961 | Geocaris |
| 3,068,341 A | 12/1962 | Ortiz et al. |
| 3,326,112 A | 6/1967 | Sadlow et al. |
| 3,636,306 A | 1/1972 | Bumpus |
| 3,692,977 A | 9/1972 | Duhamel et al. |
| 3,785,271 A | 1/1974 | Joy |
| 4,142,227 A | 2/1979 | Aikens |
| 4,630,182 A | 12/1986 | Moroi et al. |
| 4,681,024 A | 7/1987 | Ivey |
| 5,021,932 A | 6/1991 | Ivey |
| 5,443,625 A | 8/1995 | Schaffhausen |
| 5,664,872 A | 9/1997 | Spearman et al. |
| 5,918,972 A | 7/1999 | Van Belle |
| 5,934,783 A | 8/1999 | Yoshikawa |
| 6,095,671 A | 8/2000 | Hutain |
| 6,340,237 B1 | 1/2002 | Koga et al. |
| 6,498,423 B1 | 12/2002 | Bell et al. |
| 6,632,006 B1 | 10/2003 | Rippel et al. |
| 7,175,309 B2 | 2/2007 | Craw et al. |
| 7,455,432 B2 | 11/2008 | Craw et al. |

*Primary Examiner* — Jason Moon Han

(74) *Attorney, Agent, or Firm* — Greenberg Traurig LLP

(57) ABSTRACT

Some embodiments of the present invention provide a combination lighting and ventilating apparatus for installation in a structure. The apparatus can include a main housing having a first aperture that defines a ventilating inlet and a lighting outlet, a lamp housing recessed within the main housing, having first and second apertures spaced a distance from one another, and having a portion that extends outside of the main housing, and a lamp recessed within the lamp housing and the main housing. In some embodiments, the apparatus further includes a fan positioned to draw air into and through the first aperture of the lamp housing, around the lamp, and through the second aperture of the lamp housing. In another aspect of the invention, a method of lighting and ventilating a room using a combination lighting and ventilating apparatus is provided.

30 Claims, 8 Drawing Sheets

LIGHTING AND VENTILATING APPARATUS AND METHOD

CROSS-REFERENCE TO RELATED APPLICATIONS

This patent application is a continuation of U.S. application Ser. No. 11/707,244, filed Feb. 13, 2007, issued as U.S. Pat. No. 7,455,432, on Nov. 25, 2008, which is a continuation of U.S. application Ser. No. 10/714,367, filed Nov. 14, 2003, issued as U.S. Pat. No. 7,175,309, on Feb. 13, 2007, the entire contents of which are incorporated herein by reference.

BACKGROUND OF THE INVENTION

Some existing lighting and ventilating units are designed for heating a room using radiant heat from a heat lamp, and for ventilating the room using a fan moving air through the unit. In some cases, the fan also functions to carry away heat generated by the heat lamp to avoid overheating other components of the lighting and ventilating unit. In lighting and ventilating units designed for heating a room, the ventilating air can be directed near the lamp in order to draw heat away from the lamp. Other existing lighting and ventilating units combine elements of a conventional room ventilating fan with a light fixture, but have a bulky, unaesthetic appearance, employ a complicated design, do not adequately cool the light fixture, and/or employ a design in which the components of the unit are inefficiently arranged.

SUMMARY OF THE INVENTION

Some embodiments of the present invention provide a combination lighting and ventilating apparatus for installation in a structure having a surface, wherein the apparatus comprises a main housing having a first aperture, the aperture defining a ventilating inlet and a lighting outlet; a lamp housing recessed within the main housing, the lamp housing having first and second apertures spaced a distance from one another, the lamp housing having a portion extending outside of the main housing; a lamp recessed within the lamp housing and the main housing; and a fan positioned to draw air into and through the first aperture of the lamp housing, around the lamp, and through the second aperture of the lamp housing.

Also, some embodiments of the present invention provide a method of lighting and ventilating a room using a combination lighting and ventilating apparatus, wherein the combination lighting and ventilating apparatus has a main housing, a lamp housing, a lamp, and a fan, and wherein the method comprises positioning the lamp housing within the main housing to define a recessed lamp housing, the lamp housing having a portion extending outside of the main housing; positioning the lamp within the lamp housing and main housing to define a recessed lamp, the recessed lamp having an exterior surface exposed to air moved by the apparatus; illuminating the room with the lamp; driving the fan to draw air from the room into the recessed lamp housing and around the exterior surface of the recessed lamp; moving the air drawn around the lamp into the main housing; and venting the air from the main housing to a position outside of the room.

In another aspect of the present invention, an apparatus for lighting and ventilating a room having a mounting surface for the lighting and ventilating apparatus is provided, and comprises a main housing recessed with respect to the mounting surface and having a first aperture, the first aperture defining a ventilating inlet through which air is drawn into the main housing and a lighting outlet; a lamp housing recessed within the main housing, the lamp housing having a portion that extends beyond the first aperture and outside of the main housing; a lamp positioned within the lamp housing and recessed with respect to the mounting surface; and a fan positioned to draw air into the lamp housing, around the lamp, and into the main housing.

Some embodiments of the present invention provide a method for illuminating and ventilating a room, wherein the room comprises a mounting surface, and wherein the method comprises providing an illuminating and ventilating apparatus recessed within the mounting surface, the apparatus comprising a main housing, a lamp housing, a lamp having a first end and a second end, and a fan; positioning the lamp housing within the main housing such that a portion of the lamp housing extends outside of the main housing; positioning the lamp within the lamp housing such that the first end of the lamp and the second end of the lamp are recessed within the mounting surface; illuminating the room with the lamp; and driving the fan to move air into the lamp housing, around the lamp, and into the main housing.

Further aspects of the present invention, together with the organization and manner of operation thereof, will become apparent from the following detailed description of the invention when taken in conjunction with the accompanying drawings, wherein like elements have like numerals throughout the drawings.

BRIEF DESCRIPTION OF THE DRAWINGS

The present invention is further described with reference to the accompanying drawings, which show exemplary embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numerals indicate like parts.

Figure 1:
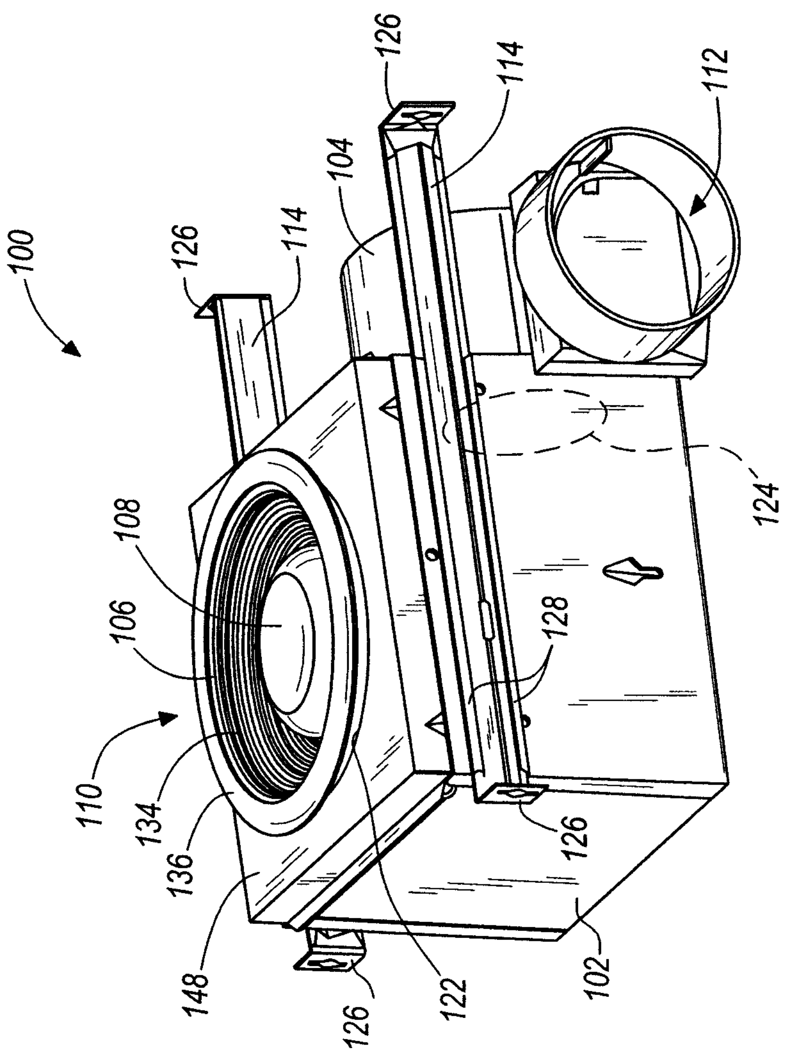
FIG. 1 is a front perspective view of an exemplary embodiment of the lighting and ventilating apparatus of the present invention.

Before the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. Furthermore, terms such as "front," "rear," "top," "bottom," and the like are only used to describe elements as they relate to one another, but are in no way meant to recite specific orientations of the apparatus, to indicate or imply necessary or required orientations of the apparatus, or to specify how the invention described herein will be used, mounted, displayed, or positioned in use.

DETAILED DESCRIPTION

Figure 2:
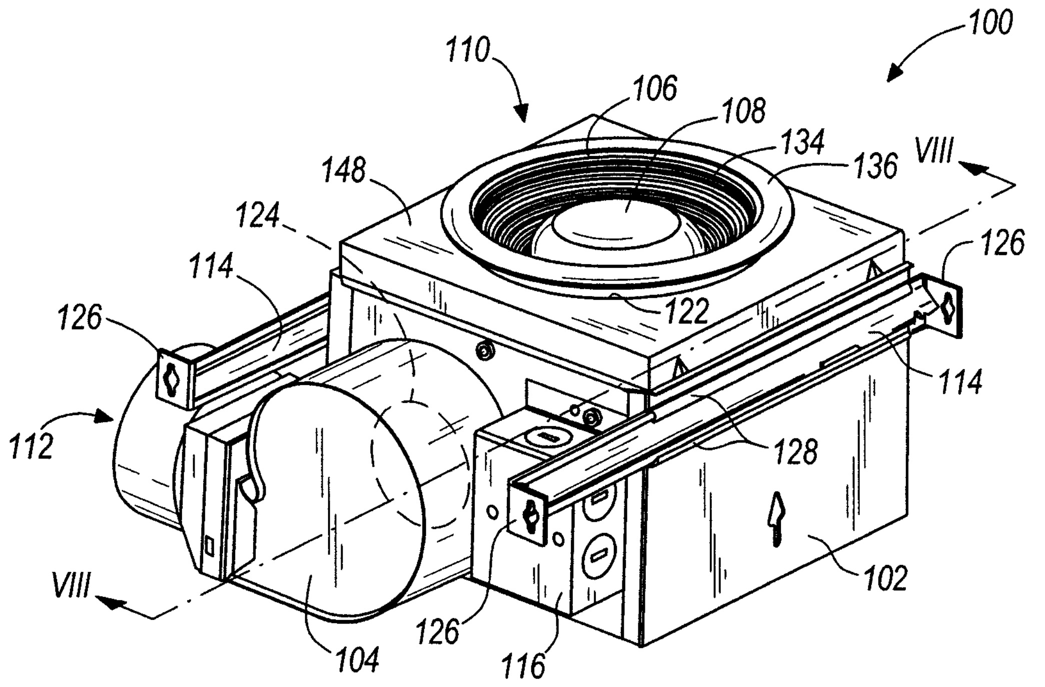
FIG. 2 is a rear perspective view of the lighting and ventilating apparatus of FIG. 1.

Referring to the figures, and more particularly to FIGS. 1 and 2, a lighting and ventilating apparatus constructed in accordance with an exemplary embodiment of the present invention is shown generally at 100. The lighting and ventilating apparatus 100 comprises several components and devices which perform various functions. In some embodiments of the present invention, the lighting and ventilating apparatus 100 includes a main housing 102 for housing various components of the apparatus 100, a fan 104 for moving air into and through the apparatus 100 as will be described in greater detail below, a lamp housing 106, a lamp 108, a ventilation inlet 110, a ventilation outlet 112, at least one mounting bracket 114 for mounting the lighting and ventilating apparatus 100 to one or more surfaces or support structures, a junction box 116 for housing one or more electrical connections for the apparatus 100, a motor 118 for driving the fan (not visible in FIGS. 1 and 2), and an electrical socket 120 for the lamp (not visible in FIGS. 1 and 2). Various embodiments of the present invention can employ different combinations of these elements as desired. However, for sake of simplicity, an exemplary lighting and ventilating apparatus 100 of the present invention will be described and illustrated herein as comprising a single main housing 102, fan 104, lamp housing 106, lamp 108, ventilation inlet 110, ventilation outlet 112, junction box 116, motor 118, electrical socket 120, and lamp 108, and two mounting brackets 114.

In some embodiments, the lighting and ventilating apparatus 100 of the present invention can be employed to illuminate and/or ventilate any room, area or space. By way of example only, in some cases the lighting and ventilating apparatus 100 can be employed to illuminate a room, area or space independently of ventilating the room, area or space. With reference to the exemplary embodiment of FIGS. 1-9, the lamp 108 can illuminate a room, and the motor 118 can drive the fan 104 to draw air into the ventilation inlet 110, into the lamp housing 106, around the lamp 108, into the main housing 102, and out the ventilation outlet 112.

The main housing 102 can be formed of any material known to those skilled in the art capable of withstanding varying temperatures (i.e., to withstand any heat radiated and/or conducted from the lamp, motor and/or other components) while providing structural integrity to the apparatus 100. In some embodiments, the main housing 102 is formed of sheet metal, but could instead be formed of a ceramic or a polymer having a relatively high melting temperature and/or glass transition temperature. The main housing 102 can have any shape, including a box-like or cubical shape, as shown in FIGS. 1-5 and 7-9, a hemi-spherical shape, a spherical shape, a pyramidal shape, and the like. The main housing 102 can form a base or frame for the lighting and ventilating apparatus 100, thereby providing points and areas of attachment for other components of the lighting and ventilating apparatus 100. As shown in FIGS. 1 and 2 for example, the main housing 102 can provide places of attachment for the fan 104, the lamp housing 106, the lamp 108, the mounting brackets 114, the junction box 116, the motor 118 (see FIGS. 5, 7 and 8), and the electrical socket 120 for the lamp 108 (see FIGS. 4 and 5).

Figure 8:
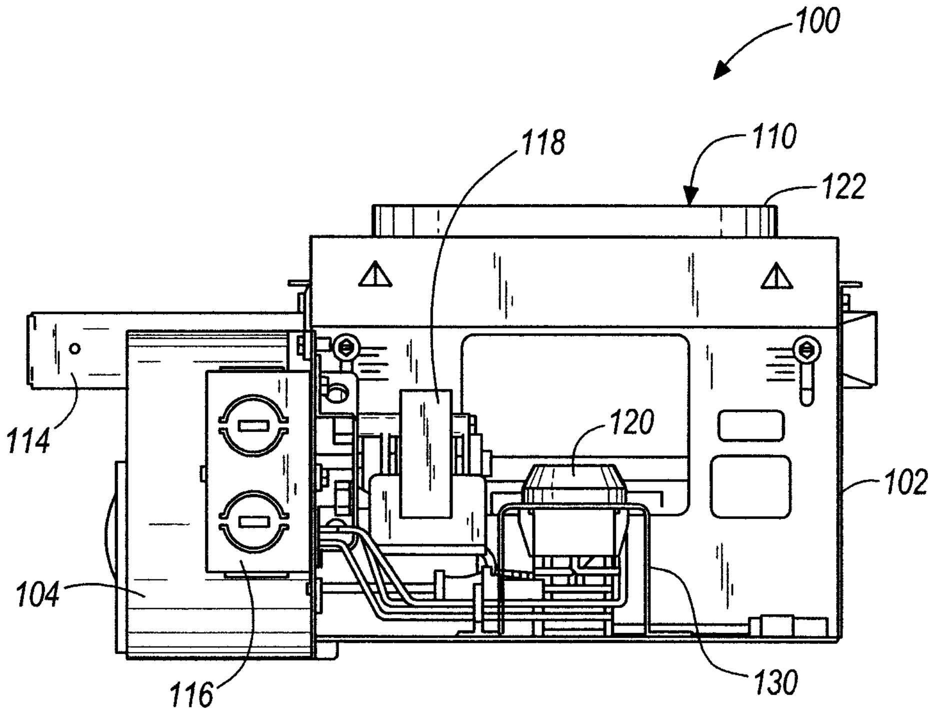
FIG. 8 is a cross-sectional view of the lighting and ventilating apparatus shown in FIGS. 1-5 and 7, taken along line VIII-VIII of FIG. 2.
Figure 9:
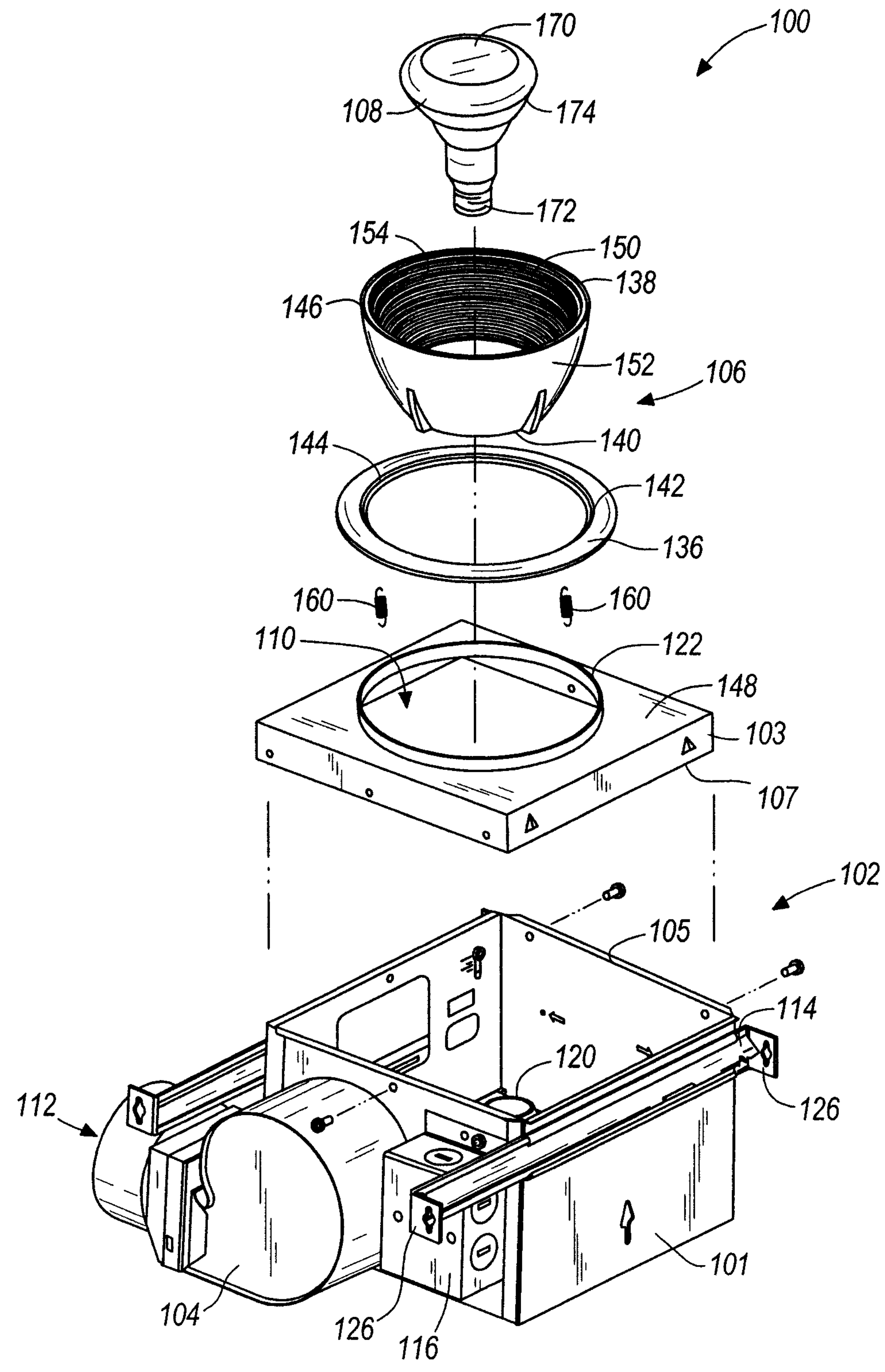
FIG. 9 is an exploded perspective view of the lighting and ventilating apparatus shown in FIGS. 1-5, 7, and 8.

The main housing 102 can comprise one integral unit or a plurality of units assembled and fastened together in any conventional manner. For example, the main housing 102 illustrated in FIGS. 1, 2 and 9 is formed of two parts: a first portion 101 and a second portion 103, each formed of sheet metal. The illustrated first portion 101 has a generally box-like or cubical shape with an open end 105. The illustrated second portion 103 has a generally box-like shape of much shorter depth, and also has an open end 107. In some embodiments (e.g., the embodiment illustrated in FIGS. 1-9), the second portion 103 adjacent the open end 107 is dimensioned to be received within the open end 105 of the first portion 101, and the second portion 103 adjacent the open end 107 is fastened to the first portion 101 adjacent the open end 105 via any of a variety of conventional fasteners, including without limitation, screws, bolts, welding, adhesive, a combination thereof, and the like. Alternatively, the first portion 101 can be dimensioned to be received within the second portion 103. In either case, the second portion 103 can further comprise at least one aperture 122, which will be described in greater detail below. In other embodiments, the aperture 122 can be formed in a portion of an integral, single-unit housing 102.

In still other embodiments, the main housing 102 can comprise a plurality of parts arranged in any manner to at least partially enclose the components of the lighting and ventilating apparatus 100 described herein. Each such part can define any portion of the main housing 102, such as a single wall, a corner, two or more walls, and the like. By way of example only, the lighting and ventilating apparatus 200 illustrated in FIGS. 10-12 has a main housing 202 constructed of several pieces as will be described in greater detail below. As discussed above, the main housing 102 can include at least one aperture 122 providing a light outlet for illuminating a room, area or space and/or a ventilation inlet. This aperture 122 can also be dimensioned to receive the lamp housing 106. Any number and shape of such apertures 122 can be used, and can be located at any position on the main housing desired, providing that each such aperture 122 is open to the room, area or space to be illuminated and/or ventilated.

The main housing 102 can further comprise another aperture 124 providing a ventilation outlet from the main housing 102. In some cases, this second aperture 124 can lead to the fan 104 operable to draw air from the main housing 102. In the embodiment illustrated in FIGS. 1-9, for example, the fan 104 is a scroll fan 104 coupled to the main housing 102 adjacent the second aperture 124, and the ventilation outlet 112 of the illustrated lighting and ventilating apparatus 100 is thus located at the downstream portion of the scroll fan 104. However, the fan 104 is not required to be coupled directly to the main housing 102 and need not necessarily be located as illustrated, as will be described in more detail below.

In some embodiments of the present invention, the main housing 102 can further comprise or be used in conjunction with mounting brackets 114 for mounting the lighting and ventilating apparatus 100 to a variety of support structures or surfaces. Any number and type of mounting bracket 114 known to those skilled in the art can be used with the lighting and ventilating apparatus 100 of the present invention. The illustrated exemplary embodiment employs two mounting brackets 114 formed of sheet metal and having a rod or beam-like structure. Each illustrated mounting bracket 114 spans the width of the main housing 102. Although the mounting bracket(s) can be located in any position(s) on the main housing 102 suitable to support the apparatus 100 with respect to surrounding structure, in some cases the mounting brackets 114 are attached to opposite side walls of the main housing 102 in any conventional manner.

The mounting brackets 114 can each have one or more flanged ends 126 providing an attachment surface to allow the mounting brackets 114 to be mounted to a variety of support structures or surfaces. For example, the mounting bracket flanged ends 126 each can easily be secured to standard studs or beams present in typical ceiling structures via any commonly known fasteners, including without limitation, bolts, nails, screws, adhesive, and the like. Although the mounting brackets 114 can be attached to the main housing 102 in any conventional manner as described above, the illustrated mounting brackets 114 are coupled to the main housing 102 via a sleeve 128 (e.g., a sheet metal sleeve 128), such that the mounting brackets 114 are slidable within the sleeve 128 and along an exterior portion of the main housing 102. Providing the mounting brackets 114 with an ability to slide relative to the main housing 102 allows the position of the main housing 102 to be adjusted relative to supporting structure. As mentioned above, a variety of commonly-known mounting brackets 114 can be employed with the present invention. The mounting brackets 114 can be separate components, or they can be integrally formed with the main housing 102. Alternatively, the main housing 102 can be mounted directly (via any of a variety of fasteners and fastening methods commonly known to those in the art) to a support structure or surface, thereby eliminating the need for mounting brackets 114.

Figure 4:
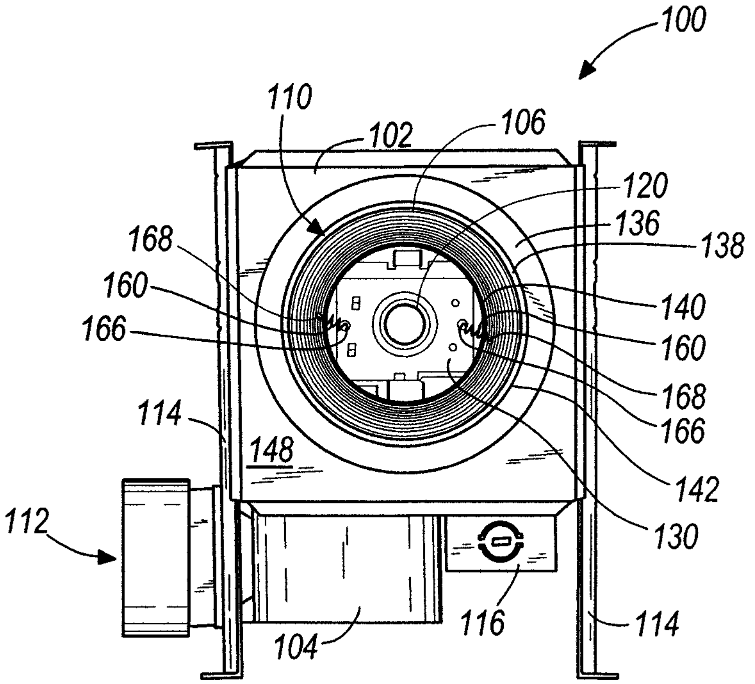
FIG. 4 is another top view of the lighting and ventilating apparatus shown in FIGS. 1-3, with some elements removed.
Figure 5:
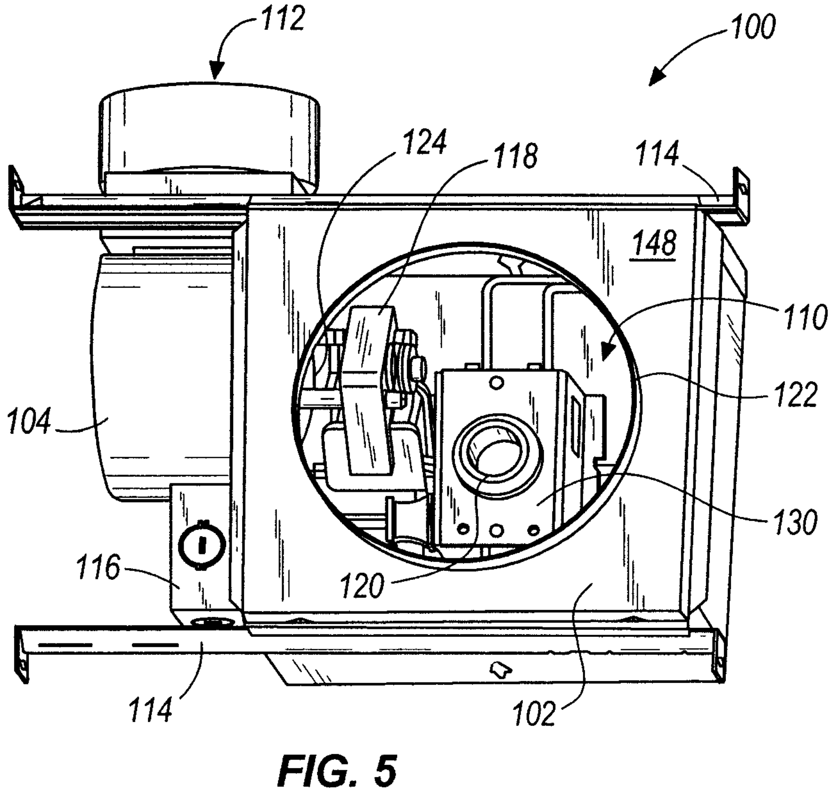
FIG. 5 is another top view of the lighting and ventilating apparatus shown in FIGS. 1-4, with some elements removed to view a portion of the interior of the apparatus.

The lighting and ventilating apparatus 100 according to some embodiments of the present invention also includes an electrical light socket 120 for supporting and providing power to the lamp 108. Any type of electrical light socket 120 can be used with the lamp 108 without departing from the present invention. For example, as best shown in FIG. 5, the circular electrical light socket 120 is mounted upon a lamp support 130, such that the illustrated circular electrical light socket 120 is concentric with the first aperture 122 of the main housing 102. Electrical light sockets 120 are commonly-known, and are therefore not discussed in further detail herein. The electrical light socket 120 need not be concentric with the main housing first aperture 122, but rather can be positioned at another location within the main housing 102 in which the lamp 108 can at least partially illuminate a room, area or space through the lamp outlet 108. For example, the electrical light socket 120 illustrated in FIGS. 4, 5 and 7-9 is positioned such that the lamp 108 is vertically oriented with respect to the lighting and ventilating apparatus 100 (employing the orientation of the apparatus 100 illustrated in the figures by way of reference only). However, the electrical light socket 120 can instead be positioned such that the lamp 108 is horizontally oriented with respect to the lighting and ventilating apparatus 100, or oriented partially horizontally and partially vertically with respect to the lighting and ventilating apparatus 100.

If employed, the lamp support 130 can take any shape and be formed of any material to support and properly position the lamp 108 of the present invention. The lamp support 130 illustrated in FIGS. 4, 5, 8 and 9 is formed of sheet metal and has a generally U-shaped cross-section. Using such lamp support can permit the lamp 108 to be positioned a desired distance from an interior surface of the main housing 102 and/or can provide a hollow space within the main housing 102 (between the underside of the lamp support 130 and an interior surface of the main housing 102) to allow for the passage of electrical wiring as is known in the art. Other lamp support shapes can be employed as desired to perform either or both of these functions. Passing electrical wiring through this hollow space can also enhance the aesthetics of the lighting and ventilating apparatus 100, because any wiring, cable, and the like can be hidden from view.

In some embodiments of the present invention, the lamp support 130 supports the electrical light socket 120 and thereby positions the lamp 108 such that the lamp 108 is recessed within both the lamp housing 106 and the main housing 102. In other embodiments, the electrical light socket 120 is directly mounted to an interior portion of the main housing 102 to position the lamp 108 such that the lamp 108 is recessed within the lamp housing 106 and the main housing 102. Alternatively, the lamp support 130 can be defined by an integral portion of the main housing 102 supporting the electrical light socket 120 and positioning the lamp 108 within the lamp housing 106 and the main housing 102. The lamp 108 can be recessed within the lamp housing 106 and the main housing 102 to various degrees, as will be discussed in greater detail below.

In some embodiments, the lighting and ventilating apparatus 100 of the present invention further comprises a junction box 116 for housing electrical wiring and connections of the lighting and ventilating apparatus 100 and power supply wiring. The junction box 116 can take any of a variety of different shapes and be formed of a variety of materials commonly known to those in the art. The junction box 116 in the illustrated exemplary embodiment is mounted directly to an exterior surface of the main housing 102, although in other embodiments the junction box 116 can be located partially or entirely within the main housing 102.

Electrical wiring from the lighting and ventilating apparatus 100 converges in the junction box 116 where it is joined with power supply wiring (i.e., directly or indirectly), such as household or building power supply wiring. The junction box 116 is positioned to isolate connections of such wiring from other areas of the lighting and ventilating apparatus 100 as is often required by local electrical code. In some embodiments, electrical wiring from the motor 118 can be connected to electrical wiring from the lamp 108 outside of the junction box 116, thereby converging prior to the junction box 116 to form common electrical wiring for the lighting and ventilating apparatus 100 that can then be connected (i.e., directly or indirectly) to the power supply wiring within the junction box 116. In other embodiments, electrical wiring from the motor 118 is connected to the power supply wiring within the junction box 116, and electrical wiring from the lamp 108 is connect to the power supply wiring within the junction box 116. Other variations of electrical wiring for the lighting and ventilating apparatus 100 are possible and fall within the scope of the present invention.

The lighting and ventilating apparatus 100 of the present invention further comprises or is used in conjunction with a motor 118 for driving the fan 104 and thereby ventilating a room, area or space. Any type of motor known to those in the art can be used to drive the fan 104. For example, the motor can comprise an alternating current electric motor, although any other type of motor or driving device can be employed as desired. The motor 118 can be positioned adjacent the fan 104 or spaced a distance from the fan 104, and is directly or indirectly drivably connected to the fan 104 in any conventional manner.

Figure 7:
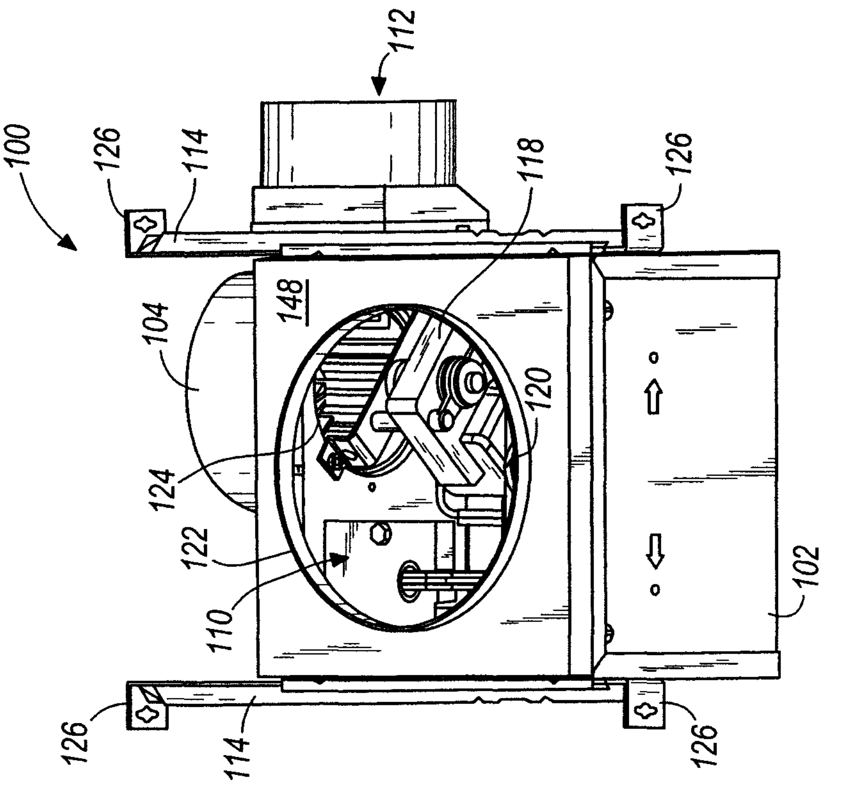
FIG. 7 is another top perspective view of the lighting and ventilating apparatus shown in FIGS. 1-5, with some elements removed to view another portion of the interior of the apparatus.

The motor 118 can be positioned within the main housing 102, near or attached to an exterior portion of the main housing 102, or at a location removed from the rest of the lighting and ventilating apparatus 100. As best illustrated in FIGS. 5, 7 and 8, the motor 118 of the illustrated exemplary embodiment is located within the main housing 102 at a position adjacent the second aperture 124 of the main housing 102 and the fan 104, and is mounted to the main housing 102 via a motor mount. Although an exemplary arrangement of the motor 118, fan 104, and main housing 102 is described above and illustrated in the figures, various other arrangements of these elements would be appreciated by one of skill in the art and fall within the spirit and scope of the present invention.

The fan 104 of the lighting and ventilating apparatus 100 (see FIGS. 1, 2 and 7-9) is a centrifugal fan, as is well-known to those skilled in the art. However, any other type of fan can be employed as desired (e.g., propeller-type fans and the like). The fan 104 can be located in a number of different positions with respect to the other components of the lighting and ventilating apparatus 100. For example, in the embodiment illustrated in FIGS. 1-5 and 7-9, the fan 104 is positioned directly adjacent the main housing 102 and the second aperture 124 of the main housing 102. In other embodiments, the fan 104 can be located partially or entirely within the main housing 102 or can be in fluid communication with the main housing 102 via one or more ducts coupled to the main housing 102. In each case, the fan 104 is still positioned with respect to the first and second apertures 122, 124 to draw air from a room, area or space into the lamp housing 106 and into the main housing 102, and to move air out of the main housing 102 through the second aperture 124 and out the ventilation outlet 112.

As mentioned above, the fan 104 can be driven by the motor 118 to draw air from a room, area or space to be ventilated into the lighting and ventilating apparatus ventilation inlet 110 (which can be located adjacent the first aperture 122 of the main housing 102 and/or the first aperture 138 of the lamp housing 106), through the lamp housing 106, around an exterior surface of the lamp 108, into and through the second aperture 140 of the lamp housing 106, through the main housing 102, through the second aperture 124 of the main housing 106, and out the ventilation outlet 112 to a position outside of the room, area or space to be ventilated.

In some embodiments of the present invention, the lighting and ventilating apparatus 100 further comprises a lamp housing 106 to house the lamp 108 and direct light to a surrounding room, area or space. The lamp housing 106 can be formed of any of a variety of materials, and in some embodiments has high heat resistance. By way of example only, the lamp housing 106 can be made of metal, ceramic, polymer, or a any combination thereof. In some embodiments, as in the embodiment illustrated in FIGS. 1-4, 6 and 9, the lamp housing 106 is formed of a high-temperature plastic.

The lamp housing 106 can comprise any of a variety of colors or a combination of colors, and can have any surface type desired (e.g., glossy and/or mirrored surface, a matte surface, and the like). The lamp housing 106 can be white, or can be any other color or combination of colors to obtain a desired appearance and/or lighting effect.

In some embodiments, the lamp housing 106 is dimensioned to be received within the first aperture 122 of the main housing 102 such that the lamp housing 106 is recessed within the main housing 102. In some embodiments, the lamp housing 106 is fully recessed within the main housing 102. In other embodiments, the lamp housing 106 is partially recessed within the main housing 102, whereby at least a portion of the lamp housing 106 extends outside of the main housing 102. As best shown in FIGS. 1-4, the illustrated exemplary embodiment comprises a lamp housing 106 dimensioned to be received within the first aperture 122 of the main housing 102, and is recessed within the main housing 102. More particularly, a portion 134 of the lamp housing 106 extends at least partially outside of the main housing 102 (i.e., at least partially outwardly of the first aperture 122 in the main housing 102).

The lamp housing 106 in the illustrated exemplary embodiment has a first aperture 138 at an end of the lamp housing 106 extending outside of the main housing 102 as shown in FIGS. 1-4, 6 and 9. In some embodiments, the lamp housing first aperture 138 is positioned adjacent the first aperture 122 of the main housing 102. In other embodiments, the lamp housing first aperture 138 is spaced a distance from the main housing 102, and is therefore spaced a distance from the first aperture 122 of the main housing 102. The first aperture 138 can comprise any of a variety of different shapes and sizes, which can be determined at least in part by the size and shape of the lamp housing 106 and the cross-sectional shape of the lamp housing 106 (discussed in greater detail below). As shown in FIGS. 1-4, 6 and 9, the lamp housing first aperture 138 can be positioned adjacent the first aperture 122 of the main housing 102 such that the lamp housing first aperture 138 is positioned to provide a light outlet and a ventilating inlet for the lighting and ventilating apparatus 100.

The lamp housing 106 can further comprise a second aperture 140. In the illustrated exemplary embodiment, as best illustrated in FIGS. 3, 4, 6 and 9, the second aperture 140 is spaced from the lamp housing first aperture 138. The lamp housing first and second apertures 138, 140 can be in fluid communication with one another, and therefore define a continuous passage in the lamp housing 106 through which air can flow. Therefore, the lamp housing second aperture 140 can be positioned to provide a ventilation outlet for the lamp housing 106.

The lamp housing ventilation outlet 140 can have any positional relationship in the apparatus 100 relative to the second aperture 124 of the main housing 102 and the ventilation outlet 112 of the lighting and ventilating apparatus 100. By way of example only, the lamp housing ventilation outlet 140 in the illustrated exemplary embodiment is located a distance from and is not aligned with the second aperture 124 or ventilation outlet 112. In other embodiments, the lamp housing ventilation outlet 140 can be closer or farther away from the second aperture 124 and/or the ventilation outlet 140 as desired.

The lamp housing first and second apertures 138, 140 can have a variety of different shapes, including circular, square, rectangular, triangular, oval, irregular, and the like, and can have the same or different shapes. The lamp housing first and second apertures 138, 140 also can be any size and do not need to be the same size. As best shown in FIGS. 3, 4, 6 and 9, the main housing first aperture 122, the lamp housing first aperture 138 and the lamp housing second aperture 140 can be circular and concentric, with the lamp housing first aperture 138 being larger than the lamp housing second aperture 140.

Therefore, ventilating air can flow into the ventilation inlet 110 of the illustrated lighting and ventilating apparatus 100 (also the lamp housing ventilation inlet) via the lamp housing first aperture 138, through the passage formed by the lamp housing 106, out the lamp housing ventilation outlet defined by the lamp housing second aperture 140, and into the main housing 102. Other routes for ventilating air flowing into the lighting and ventilating apparatus 100 are possible, with the lamp housing first aperture 138 providing a ventilation inlet for the lamp housing 106, and the lamp housing second aperture 140 providing a ventilation outlet for the lamp housing 106.

The lamp housing 106 can take any shape capable of housing the lamp 108 and directing light into a room, area, or space. As discussed below, the lamp 108 of the illustrated exemplary embodiment is a flood lamp and is generally cone-shaped. Accordingly, the illustrated lamp housing 106 has a generally frusto-conical shape with a circular cross-section, and is dimensioned to house the lamp 108 and provide a light outlet to a room, area or space. As discussed above, the lamp housing 106 can have a first aperture 138 that provides a light outlet and a ventilation inlet, and a second aperture 140 that provides a ventilation outlet from the lamp housing 106 into the main housing 102.

Figure 6:
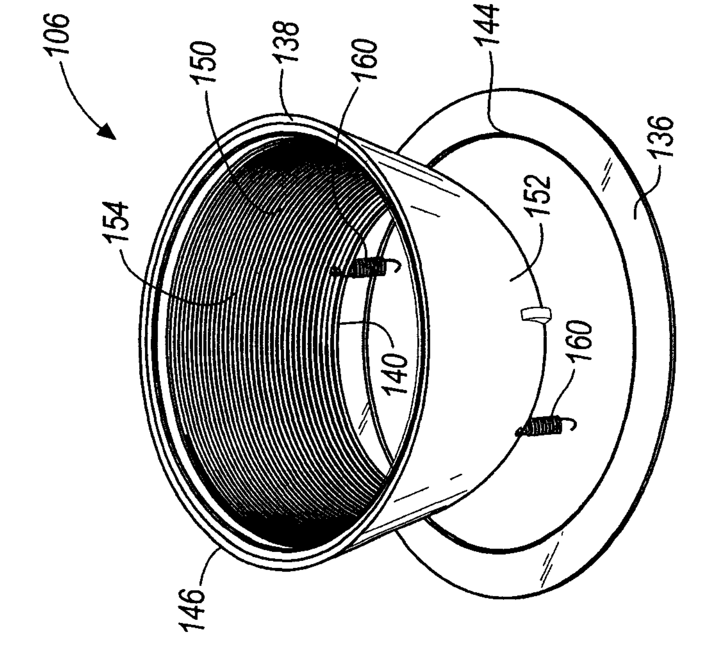
FIG. 6 is a perspective view of a lamp housing assembly for use with the lighting and ventilating apparatus shown in FIGS. 1-5.

By virtue of the frusto-conical shape of the lamp housing 106 (best illustrated in FIGS. 6 and 9), the first aperture 138 has a larger diameter than the second aperture 140, thereby allowing illumination of the room, area or space, while funneling ventilating air into the main housing 102. As best shown in FIG. 6, the lamp housing 106 has an inner surface or periphery 150 defining an interior volume, and an outer surface or periphery 152. The outer periphery 152 of the lamp housing 106 (see FIGS. 6 and 9) is at least slightly outwardly bowed, forming a bowl-shaped lamp housing 106 with open ends (defined by the first and second apertures 138, 140). Accordingly, the illustrated lamp housing 106 has a modified frusto-conical shape because the walls of the lamp housing 106 between the first and second apertures 138, 140 are not straight. By shaping the lamp housing 106 to bow outwardly between the first and second apertures 138, 140, the interior volume of the lamp housing 106 is increased. When the lighting and ventilating apparatus 100 is assembled, the lamp 108 will consume a portion of the interior volume of the lamp housing 106. Therefore, the modified frusto-conical shape can allow more air to pass through the lamp housing 106 and around the lamp 108 during ventilation operation of the apparatus 100 (i.e., when the fan 104 is driven). Of course, other lamp housing shapes are possible, including without limitation cylindrical, hour glass-shaped, box-like, pure frusto-conical (i.e., relatively straight walls) or funnel-shaped, inwardly-bowed frusto-conical, and the like. The shape of the lamp housing 106 can be determined at least in part by the shape of the lamp 108 used.

As mentioned above, the illustrated lamp housing 106 has a circular cross-section and circular first and second apertures 138, 140, each aperture 106, 138, 140 having a diameter. In the illustrated exemplary embodiment, the ratio of the diameter of the first aperture 138 to the diameter of the second aperture 140 is approximately 1.5:1. This ratio of aperture sizes allows the lamp housing 106 to at least partially hide internal portions of the lighting and ventilating apparatus 100 that may not be particularly attractive to viewers while providing good lighting results, and creating a sufficiently large ventilation outlet of the lamp housing 106 such that ventilating air is not restricted from passing around an exterior surface of the lamp 108 and into the main housing 102. In other words, because the first aperture 138 of the illustrated lamp housing 106 is only 1.5 times larger than the second aperture 140, internal portions of the lighting and ventilating apparatus 100 can be at least partially concealed, while still allowing light from the lamp 108 to pass out of the first aperture 138 and illuminate the room, area or space, and while enabling air to pass through the lamp housing 106, around the lamp 108, and into the main housing 102.

In some embodiments of the present invention, the ratio of the diameter of the first aperture 138 to the diameter of the second aperture 140 is at least 1.1:1 and is no greater than 3.0:1. In other embodiments of the present invention, this ratio is no less than 1.3:1 and is no greater than 2.5:1. In still other embodiments, a ratio of no less than 1.5:1 and no greater than 2.0:1 provides good ventilation and lighting results while maintaining an acceptable appearance of the apparatus 100. In addition, good results can be obtained when the ratio of the first aperture diameter to the second aperture diameter is approximately 1.5:1. Other ratios of aperture sizes are possible to create the combined effect of providing ample illumination and ventilation while concealing unaesthetic portions of the lighting and ventilating apparatus 100.

Figure 3:
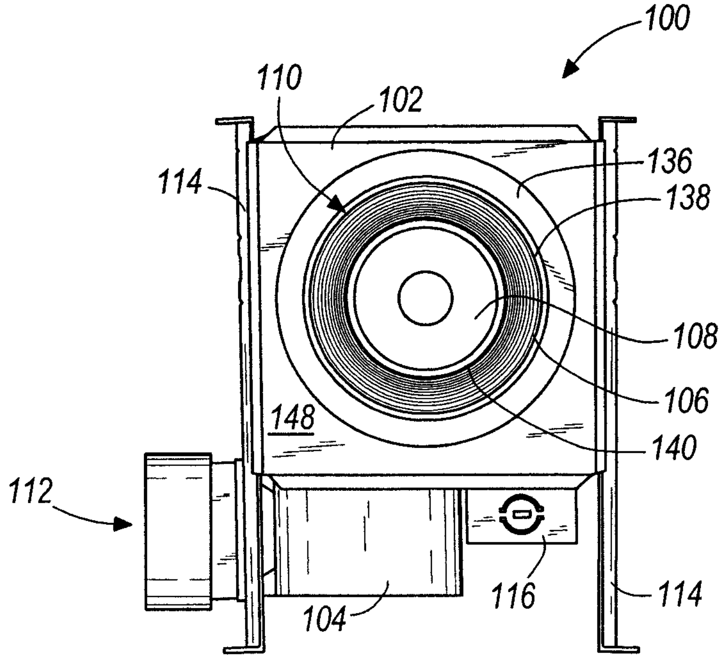
FIG. 3 is a top view of the lighting and ventilating apparatus shown in FIGS. 1 and 2.

Depending at least in part upon the size of the lamp housing first aperture 138, at least a portion of the inner surface 150 of the lamp housing 106 can be visible to a viewer (see FIGS. 1-3, for example). In some embodiments, the inner surface 150 of the lamp housing 106 can comprise a baffled surface 154 (e.g., ribbed or corrugated), a dimpled surface, a faceted surface, or any other surface capable of dispersing light from the lamp 108 into the room, area or space. In other embodiments, the inner surface 150 is relatively smooth, and allows light from the lamp 108 to reflect therefrom in a less dispersed manner.

In some embodiments, the lamp housing 106 further comprises or is used in conjunction with a flange 136. The flange 136 can be integral or attached to the lamp housing 106 or can be a separate element retained in contact with the lamp housing 106 as will be described in greater detail below. In other embodiments, the lamp housing 106 is positionable within the main housing 102 (i.e., within the first aperture 122) and does not require or otherwise employ a flange 136 (integral or otherwise) to engage a portion of the main housing 102 or a surface of the wall or ceiling in which the apparatus 100 is installed. As best illustrated in FIGS. 6 and 9, the flange 136 can be a separate element having an annular shape, and the lamp housing 106 can have a circular cross-sectional shape, although other cross-sectional shapes of the lamp housing 106 and flange 136 (if employed) can be used as desired.

As shown in FIGS. 1-4, 6 and 9, the portion 134 of the illustrated lamp housing 106 can be engagable with the annular flange 136 such that the annular flange 136 provides or defines a radial extension of the lamp housing 106. The flange 136 can also be positioned adjacent a mounting surface, such as a surface of a wall or ceiling in which the apparatus 100 is installed. For example, the illustrated annular flange 136 can be mounted upon a ceiling, wall, or other structure such that a portion of the ceiling, wall, or other structure is positioned intermediate the annular flange 136 and an exterior surface 148 of the main housing 102. In this manner, the main housing 102 can be recessed within a wall or ceiling while the annular flange 136 is retained on the exterior surface of the wall or ceiling adjacent the first aperture 122 of the main housing 102. The flange 136 need not be the same size as the flange 136 shown in the FIGS. 1-4, 6 and 9. That is, in some embodiments, the flange 136 (integrally formed with the lamp housing 106 or otherwise) can be a relatively small extension of the portion 134 of the lamp housing 106 or can be larger than that shown in the figures.

The flange 136, if employed, can provide a greater surface area for the lamp housing 106 to engage at least one of the main housing 102 and a surface within which the apparatus 100 is recessed. However, some embodiments of the present invention do not employ a flange. That is, in other embodiments the lamp housing 106 is positionable within the main housing 102 (i.e., the first aperture 122 of the main housing 102) and does not require a flange 136 (integral or otherwise) to engage a portion of the main housing 102 or a portion of a surface within which the apparatus 100 is recessed. In such embodiments, the portion 134 of the lamp housing 106 that extends outside of the main housing 102 can be larger than the first aperture 122 of the main housing 102, thereby inhibiting the lamp housing 106 from passing completely through the first aperture 122 of the main housing and allowing the lamp housing 106 to provide an aesthetically pleasing ventilation inlet and light outlet for the lighting and ventilating apparatus 100. Furthermore, in such embodiments, the portion 134 of the lamp housing 106 extending outside of the main housing 102 can rest against or adjacent to the surface of the wall or ceiling in which the apparatus 100 is recessed (rather than an arrangement in which the wall or ceiling is sandwiched between a flange 136 and the exterior surface 148 of the main housing 102 as described above).

The flange 136 need not necessarily be annular, and can take a number of different sizes and shapes, including without limitation rectangular, square, triangular, and the like). As mentioned above, the flange 136 can be integrally formed with the lamp housing 106 or can be a separate element engagable with the lamp housing 106. In some embodiments, the flange 136 defines an aperture 142 positioned adjacent the first aperture 122 of the main housing 102 and the lamp housing first aperture 138 when the lighting and ventilating apparatus 100 is assembled (see FIGS. 1-4 and 9). The flange aperture 142 of such embodiments can have the same shape as the lamp housing first aperture 138, and the first aperture 122 of the main housing 102 (e.g., circular in FIGS. 1-4, 6 and 9). However, the flange aperture 142 can have any shape or size that allows the flange 136 to cooperate with the lamp housing 106 as described above.

When employed as a separate element (i.e., not an integral portion of the lamp housing 106), the flange 136 can comprise a ridge 144 (best illustrated in FIGS. 6 and 9) positioned to engage a portion of the lamp housing 106. In some embodiments, the lamp housing 106 has a lip 146 (see, for example, FIGS. 6 and 9) positioned to engage the ridge 144 of the flange 136, thereby coupling the lamp housing 106 to the flange 136. With particular reference to the illustrated exemplary embodiment, the lamp housing 106 has a circular cross-section and a circular lip 146, while the annular flange 136 has a circular ridge 144 dimensioned to receive and hold the lip 146 of the lamp housing lip 106. The engagement between the lip 146 of the lamp housing 106 and the ridge 144 of the flange 136 inhibits the lamp housing 106 from passing through the first aperture 122 of the main housing, while providing an extension of the lamp housing 106. As described above, extending the lamp housing 106 in this manner provides a greater surface area for the lamp housing 106 to engage the main housing 102 and/or the surface in which the apparatus 100 is recessed, while providing an attractive border to the lighting and ventilating apparatus 100.

The portion 134 of the lamp housing 106 need not necessarily engage a flange 136 as shown in FIGS. 1-4, 6 and 9. In those embodiments in which a flange 136 is employed, the lamp housing 106 can be coupled to the flange 136 in a variety of ways. For example, in some embodiments the lamp housing 106 instead has a ridge that engages a lip on the flange 136. As best illustrated in FIGS. 6 and 9, the lip 146 of the lamp housing 106 and the ridge 144 of the flange 136 are configured such that the flange 136 is positioned adjacent the main housing 102, and the lamp housing 106 is coupled to a portion of the flange 136 on a side of the flange 136 opposite the main housing 102, thereby being positioned farther away from the main housing 102 than the flange 136. However, in other embodiments, the lip 146 of the lamp housing 106 and the ridge 144 of the flange 136 can instead be configured such that the lamp housing 106 is positioned adjacent the main housing 102, and the flange 136 is positioned farther from the main housing 102 and is coupled to a portion of the lamp housing 106 opposite the main housing 102. Other coupled relationships between the lamp housing 106 and the flange 136 are possible and fall within the spirit and scope of the present invention.

As mentioned above, in some embodiments the lamp housing 106 can be dimensioned to be received in the first aperture 122 of the main housing 102. The exemplary lighting and ventilating apparatus 100 illustrated in FIGS. 1-9 employs a lamp housing 106 that is dimensioned to be received within the first aperture 122 of the main housing 102 but which is substantially prevented from passing through the first aperture 122 of the main housing 102 by the flange 136. As described above, the lamp housing 106 illustrated in FIGS. 1-4, 6 and 9 includes a lip 146 that engages a ridge 144 of the flange 136 (although other relationships of the lamp housing 106 and flange 136 are possible). Since the flange 136 provides a radial extension of the lamp housing 106, the flange 136 has a larger outer diameter than the first aperture 122 of the main housing 102. As a result, the lamp housing 106 is maintained in a position in which a portion 134 of the lamp housing 106 extends outside of the main housing 102 (and particularly, outside of the first aperture 122 of the main housing 102).

The lighting and ventilating apparatus 100 of the present invention can be installed in a variety of surfaces and structures as explained above, including ceilings, walls, and the like. To retain the lamp housing 106 attached to the rest of the ventilating apparatus 100, one or more fasteners can connect the lamp housing 106 to another part of the lighting and ventilating apparatus 100. As best illustrated in FIGS. 4, 6 and 9, by way of example only, two springs 160 are connected to the lamp housing 106 and to the main housing 102. Each spring 160 includes a hook at each end to connect to an aperture in the lamp housing 106 and the main housing 102. For this purpose, the lamp support 130 of the main housing 102 can include apertures 166 (see, for example, FIG. 4), while the lamp housing 106 includes apertures 168 in a lower portion thereof (i.e., near the second aperture 140 of the lamp housing 106). Therefore, assembling the illustrated lighting and ventilating apparatus 100 includes positioning the flange 136 adjacent the main housing 102 (i.e., the first aperture 122 of the main housing 102) and/or a surface in which the apparatus 100 is recessed, inserting the lamp housing 106 within the first aperture 122 of the main housing 102 until the lip 146 of the lamp housing 106 engages the ridge 144 of the flange 136, inserting hooks of the springs into the lamp support apertures 166 and into the lamp housing apertures 168 to couple the lamp housing 106 to the main housing 102.

Although any type of conventional fastener can be employed to secure the lamp housing 106 to the rest of the apparatus 100, the use of springs provides a biasing force of the lamp housing 106 against the flange 136 (i.e., the lip 146 of the lamp housing 106 against the ridge 144 of the flange 136) and the surface in which the apparatus 100 is recessed. As noted above however, the lamp housing 106 can be coupled to the main housing 102 in a variety of other ways, including by typical fasteners (e.g., bolts, screws, adhesive, and the like), magnets, and other permanent, semi-permanent and temporary fasteners. The lamp housing 106 need not necessarily be biased against the flange 136 (if employed), the surface in which the apparatus 100 is recessed, or the main housing 102, but can instead be fixed relative to such other elements when in an assembled position. Other fasteners (with or without biasing force) are well-known to those in the art and fall within the scope of the present invention.

The lamp 108 employed in the present invention can be any type of lamp desired to illuminate a room, area or space adjacent the apparatus 100, including an incandescent, fluorescent, halogen, infrared, black light, and the like (whether flood, globe, or otherwise), without departing from the present invention. The materials used to form the main housing 102 and associated components, the lamp housing 106, and other elements of the lighting and ventilating apparatus 100 can be determined at least in part by the type of lamp 108 used in the lighting and ventilating apparatus 100. For example, if a heat lamp (e.g., infrared lamp) is used, the lamp housing 106 can include a highly reflective inner surface 150. The lamp 108 shown in FIGS. 1-3 and 9 is a 120 V/45 W GE-brand flood lamp.

The lamp 108 shown in FIGS. 1-3 is recessed within the lighting and ventilating apparatus 100, thereby forming a recessed light. The lamp 108 comprises a first end 170 and second end 172, as shown in FIG. 9. In some embodiments, the lamp 108 can also be recessed within the main housing 102, such that the lamp 108 is recessed within the lamp housing 106 and the main housing 102. The lamp 108 can be recessed within the lamp housing 106 and the main housing 102 to various degrees. In some embodiments, the lamp 108 is partially recessed within the lamp housing 106 and the main housing 102, such that the first end 170 of the lamp 108 extends outwardly of the main housing 102 and/or the lamp housing 106. In other embodiments, the lamp 108 is fully recessed within the lamp housing 106 and the main housing 102, such that the first and second ends 170, 172 of the lamp 108 are recessed within the lamp housing 106 and the main housing 102. Alternatively, the degree of lamp recess can be measured relative to the exterior surface of the structure (e.g., wall, ceiling, etc.) in which the apparatus 100 is installed. In some embodiments, the first and second ends 170, 172 of the lamp 108 are both recessed inwardly from such a surface when the lamp 108 is installed in the electrical light socket 120 (as best shown in FIG. 8), although in other embodiments only the second end 172 is recessed with respect to such a surface.

With reference to the orientation of the apparatus 100 in FIG. 8 for purposes of description only, the lamp 108 can be generally vertically-oriented. However, even if the lamp 108 is oriented horizontally or partially horizontally and partially vertically, the first and second ends 170, 172 can still both be recessed inwardly relative to the lamp housing 106, the main housing 102, and/or the exterior surface of the structure (e.g., wall, ceiling, etc.) in which the apparatus 100 is installed.

Regardless of the type of lamp 108 employed with the present invention, the lamp 108 has an exterior surface 174 that is in fluid communication with air passing into and through the ventilating apparatus 100 during operation of the fan 104. That is, the exterior surface 174 of the lamp 108 is exposed to ventilating air as it is drawn into the lighting and ventilating apparatus 100. Therefore, ventilating air can be drawn into the lamp housing first aperture 138, around the lamp 108 (more specifically, in passing contact with the exterior surface 174 of the lamp 108), and into the main housing 102.

Figure 10:
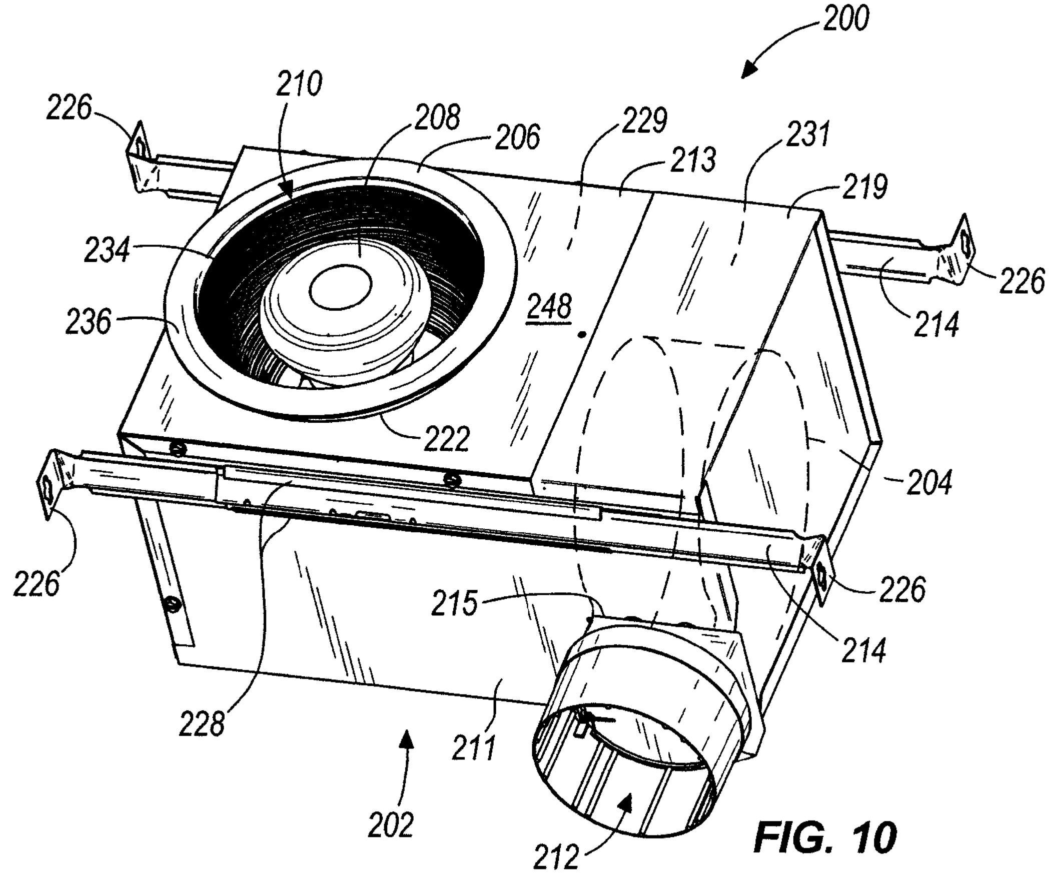
FIG. 10 is a front perspective view of an another exemplary embodiment of the lighting and ventilating apparatus of the present invention.
Figure 11:
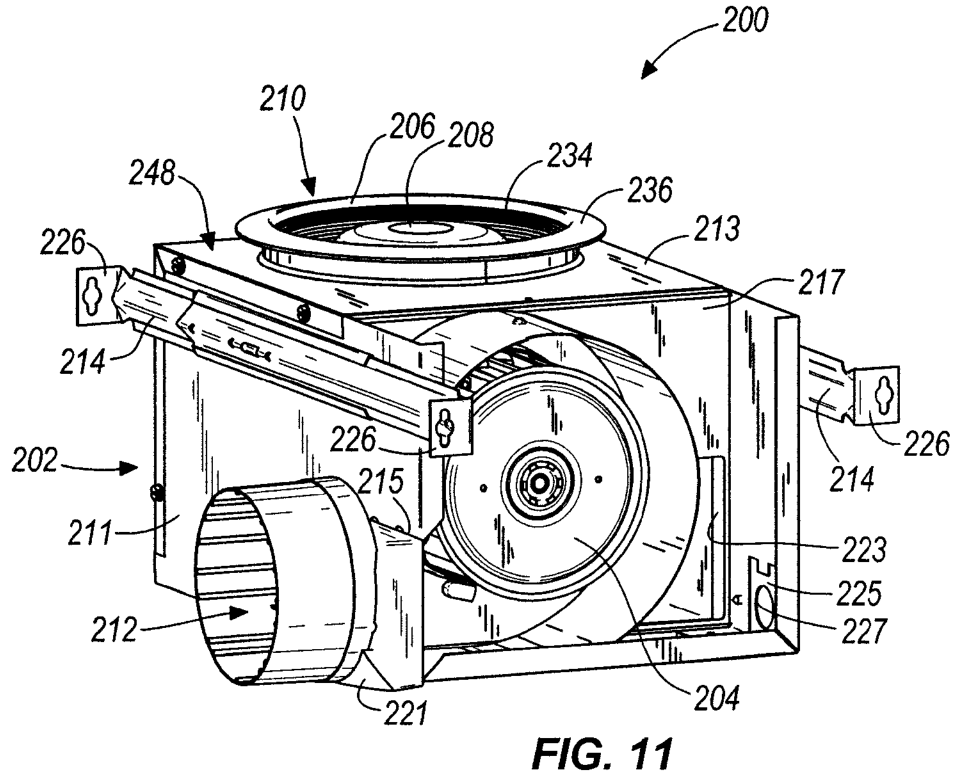
FIG. 11 is a side perspective view of the lighting and ventilating apparatus of FIG. 10, with some elements removed to view a portion of the interior of the apparatus.
Figure 12:
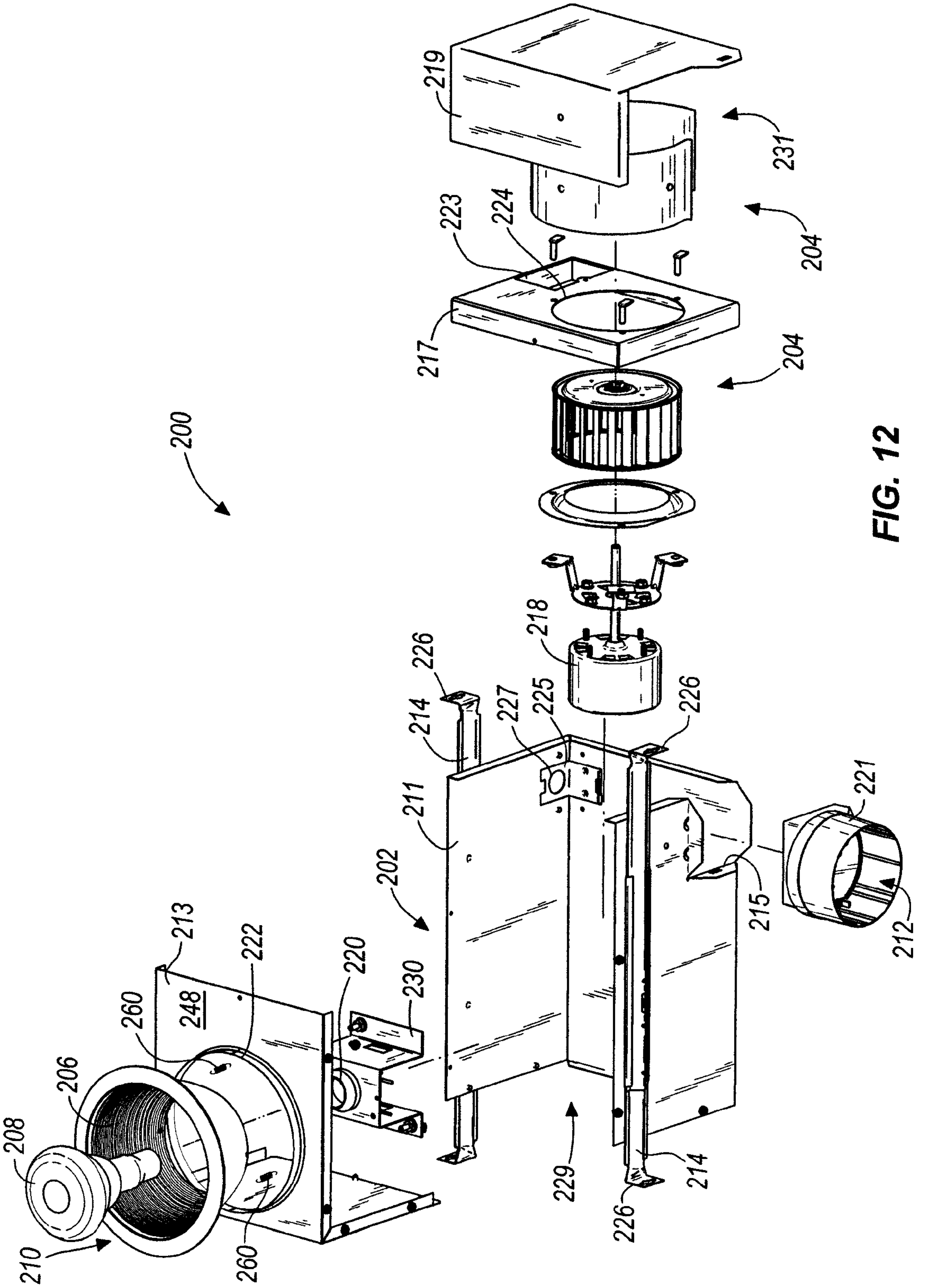
FIG. 12 is an exploded perspective view of the lighting and ventilating apparatus shown in FIGS. 10 and 11.

FIGS. 10-12 illustrate another lighting and ventilating apparatus 200 according to the present invention, wherein like numerals represent like elements. The lighting and ventilating apparatus 200 shares many of the same elements and features described above with reference to the illustrated embodiment of FIGS. 1-9. Accordingly, elements and features corresponding to elements and features in the illustrated embodiment of FIGS. 1-9 are provided with the same reference numerals in the 200 series. Reference is made to the description above accompanying FIGS. 1-9 for a more complete description of the features and elements (and alternatives to such features and elements) of the embodiment illustrated in FIGS. 10-12.

The housing 202 of the lighting and ventilating apparatus 200 can be constructed of any number of housing parts. By way of example only, the housing 202 illustrated in FIGS. 10-12 is constructed of fours parts: a upwardly-opening bottom portion 211 having two sides and a base, a two-sided, generally L-shaped portion 213 that fits adjacent an end of the bottom portion 211 and forms a portion of a top of the housing 202, a wall 217 that defines an internal wall of the housing 202, and a two-sided, generally L-shaped portion 219 that fits adjacent an opposite end of the bottom portion 211 and the wall 217, thereby forming the remainder of the top of the housing 202.

The wall 217 divides the housing 202 into a first internal compartment 229 and a second internal compartment 231. The generally L-shaped portion 213 includes a first aperture 222, and the wall 217 includes a second aperture 224, thereby forming a path for ventilating air into and out of the first compartment 229. The first internal compartment 229 houses a lamp support 230 having an electrical light socket 220, and a motor 218 for driving a fan 204. The second internal compartment 231 houses the fan 204 and serves as a junction box for connecting power supply wiring to electrical wiring from the motor 218 and electrical wiring from a lamp 208. An aperture 223 in the wall 217 provides a path for electrical wiring from the motor 218 and the lamp 208 to pass from the first compartment 229 into the second compartment 231 where it can be connected to power supply wiring in the second internal compartment. A bracket 225 having an aperture 227 can be coupled to or at least partially integral with a wall of the housing (e.g., the bottom portion 211, as shown in FIGS. 10-12) and can have a corresponding aperture to provide a path for power supply wiring to enter the second compartment 231 to be connected to electrical wiring from the motor 218 and/or the lamp 208. Alternatively, at least one wall of the portions 211, 219 defining the second compartment 231 can have an aperture therethrough to permit passage of power supply wiring into the second compartment.

Unlike the embodiment illustrated in FIGS. 1-9, the lighting and ventilating apparatus 200 of FIGS. 10-12 has a common compartment for the fan 204 and a junction box. In other words, the same compartment 231 used to house the fan 204 also defines a junction box for electrical wiring in the lighting and ventilating apparatus 200. Instead, the second compartment 231 formed within the housing 202 houses the fan 204 and also serves as a junction box for the lighting and ventilating apparatus 200. In some embodiments, a wall of the second compartment 231 serves a dual purpose: to close an end of the fan scroll (in which the fan 204 rotates) and to at least partially define a junction box as just described. Such a construction can save the cost of dedicated elements or structure performing these separate functions.

With continued reference to FIGS. 10-12, the second compartment 231 can have an outlet connector 221 extending from a wall of the second compartment 231 (and from an aperture 215 in the wall) and defining the outlet 212 of the lighting and ventilating apparatus 200. Depending at least partially upon the orientation of the fan 204 in the second compartment 231, the aperture 215 and outlet connector 221 can be located on any wall of the second compartment 231. Air moved by the fan 204 in the second compartment 231 can exit the lighting and ventilating apparatus 200 through the aperture 215 and outlet connector 221.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

We claim:

1. A lighting and ventilating apparatus, comprising:

a main housing including a first compartment with a first aperture and a second compartment with a second aperture, the main housing positionable behind a building surface of a structure, the main housing includes a plurality of walls, at least one of the plurality of walls oriented substantially parallel to the building surface of the structure, the at least one wall oriented substantially parallel to the building surface includes the first aperture;

a lamp housing and flange combination, the lamp housing being at least partially receivable within the first compartment through the first aperture and the flange being engageable with the building surface and the at least one of the plurality of walls while the lamp housing is biased toward an interior of the main housing, the flange positioned to abut the at least one of the plurality of walls when the lamp housing is biased toward the interior of the main housing; and wherein the first aperture is configured and arranged to enable light emission from an outer surface of a lamp installed in the lamp housing to pass through the first aperture, wherein an outer surface of the lamp does not extend out of the lamp housing through the first aperture; and a fan at least partially positioned within the second compartment and configured to move air into the main housing via the first aperture and out of the main housing via the second aperture.

2. The apparatus of claim 1, wherein the lamp housing includes a first end having a first lamp housing aperture and a second end positioned a distance from the first end and having a second lamp housing aperture, wherein the lamp housing, the first lamp housing aperture, and the second lamp housing aperture define an air flow path through the main housing.

3. The apparatus of claim 2, further comprising a lamp recessed with respect to the lamp housing and the wall, the lamp positioned at least partially within the air flow path.

4. The apparatus of claim 3, wherein the air flow path is operable to direct air between the lamp and the lamp housing into the main housing, such that the moving air is operable to cool the lamp.

5. The apparatus of claim 1, wherein the first lamp housing aperture and the second lamp housing aperture each define a substantially circular shape such that the ratio of the diameter of the first lamp housing aperture with respect to the diameter of the second lamp housing aperture is between about 1.1:1 to about 3.0:1.

6. The apparatus of claim 1, wherein the lamp housing is substantially frustoconical and defines a ribbed surface extending between the first lamp housing aperture and the second lamp housing aperture.

7. The apparatus of claim 1, further comprising a junction box coupled to an exterior of the main housing and an electrical socket positioned within the main housing, the electrical socket operable to receive and provide power to a lamp.

8. The apparatus of claim 1, wherein the main housing defines a third aperture communicating between the first and second compartments.

9. A lighting and ventilating apparatus, comprising:

a main housing positionable behind a building surface and including a first compartment with a first aperture, a second compartment with a second aperture and a third aperture, the third aperture permitting communication between the first and second compartments;

a lamp housing and flange combination, the lamp housing being at least partially receivable within the first compartment through the first aperture and the flange being engageable with the building surface while the lamp housing is biased toward an interior of the main housing, the lamp housing includes a first end having a first lamp housing aperture and a second end positioned a distance from the first end and having a second lamp housing aperture, wherein the lamp housing, the first lamp housing aperture, and the second lamp housing aperture define a path for air to enter the main housing, wherein the path for air to enter the main housing is configured and arranged so that a flow of air passes through the first lamp housing aperture before passing through the second lamp housing aperture; and wherein the first aperture is configured and arranged to enable light emission from an outer surface of a lamp installed in the lamp housing to pass through the first aperture, wherein an outer surface of the lamp does not extend out of the lamp housing through the first aperture a fan at least partially positioned within the second compartment and configured to move air into the main housing through the first lamp housing aperture and around an outer surface of a lamp installed in the lamp housing, through the second lamp housing aperture and into the main housing via the first aperture and out of the main housing via the second aperture; and a set of electronics for driving a motor connected to the fan, the set of electronics being placed at least partially in the first compartment.

10. The apparatus of claim 9, wherein the motor is positioned at least partially within the first compartment.

11. The apparatus of claim 9, wherein the first lamp housing aperture and the second lamp housing aperture each define a substantially circular shape such that the ratio of the diameter of the first lamp housing aperture with respect to the diameter of the second lamp housing aperture is between about 1.1:1 to about 3.0:1.

12. The apparatus of claim 9, wherein the lamp housing is substantially frustoconical and defines a ribbed surface extending between the first lamp housing aperture and the second lamp housing aperture.

13. A lighting and ventilating apparatus, comprising:

a main housing including a first compartment with a first aperture and a second compartment with a second aperture, the main housing capable of being positioned behind a building surface of a structure, the main housing including a plurality of walls, at least one of the plurality of walls oriented substantially parallel to the building surface of the structure, wherein the at least one wall oriented substantially parallel to the building surface includes the first aperture;

a lamp housing capable of being at least partially received within the first compartment through the first aperture, the lamp housing comprising a portion capable of extending beyond the first aperture and outside of the main housing, the lamp housing including a first end comprising a first lamp housing aperture and a second end positioned a distance from the first end and comprising a second lamp housing aperture, wherein the lamp housing, the first lamp housing aperture, and the second lamp housing aperture define a path for air to enter the main housing, wherein the path for air to enter the main housing is configured and arranged so that a flow of air passes through the first lamp housing aperture before passing through the second lamp housing aperture;

a flange engaging the portion of the lamp housing that extends beyond the first aperture of the main housing, and the flange engages the building surface and the at least one of the plurality of walls while the lamp housing is biased toward an interior of the main housing; and wherein the first aperture is configured and arranged to enable light emission from an outer surface of a lamp installed in the lamp housing to pass through the first aperture, wherein an outer surface of the lamp does not extend out of the lamp housing through the first aperture; and a fan at least partially positioned within the second compartment and configured to move air into the main housing through the first lamp housing aperture and around an outer surface of a lamp installed in the lamp housing, through the second lamp housing aperture and into the main housing via the first aperture and out of the main housing via the second aperture.

14. The lighting and ventilating apparatus of claim 13, and further comprising a lamp support positioned substantially within the first compartment.

15. The lighting and ventilating apparatus of claim 14, and further comprising a lamp recessed with respect to the lamp housing and the wall, the lamp capable of being coupled to the lamp support.

16. The lighting and ventilating apparatus of claim 14, and further comprising at least one spring coupled to the lamp housing and at least one lamp support aperture defined through the lamp support, the at least one spring to couple the lamp housing to the lamp support.

17. The lighting and ventilating apparatus of claim 14, wherein the lamp support comprises an electrical light socket, the electrical light socket is concentric with the first aperture.

18. The lighting and ventilating apparatus of claim 13, wherein the lamp housing is substantially frustoconical and defines a ribbed surface extending between the first lamp housing aperture and the second lamp housing aperture.

19. The lighting and ventilating apparatus of claim 13, and further comprising a wall positioned substantially internally with respect to the main housing, the wall comprising a third aperture, the third aperture capable of permitting fluid communication between the first and the second compartments.

20. The lighting and ventilating apparatus of claim 19, and further comprising a motor drivably coupled to the fan, the motor positioned substantially in the first compartment and coupled to the wall.

21. The lighting and ventilating apparatus of claim 20, wherein the second aperture is positioned through a wall of the second compartment oriented substantially perpendicular to the building surface.

22. The lighting and ventilating apparatus of claim 13, and further comprising mounting brackets capable of being used to couple the main housing to the structure.

23. The lighting and ventilating apparatus of claim 13, and further comprising an arcuate wall positioned substantially within the second compartment.

24. The lighting and ventilating apparatus of claim 13, and further comprising a power aperture defined through one of the plurality of walls, the power aperture capable of at least partially providing a path for electrical circuitry from the structure to the apparatus.

25. The lighting and ventilating apparatus of claim 13, and further comprising electrical wiring positioned at least partially within the second compartment.

26. The lighting and ventilating apparatus of claim 13, and further comprising an outlet connector positioned substantially adjacent to the second aperture.

27. The lighting and ventilating apparatus of claim 13, wherein the lamp housing includes being formed of a metal.

28. The lighting and ventilating apparatus of claim 13, wherein the first lamp housing aperture and the second lamp housing aperture are substantially concentric.

29. The lighting and ventilating apparatus of claim 13, wherein the flange comprises a generally annular shape.

30. The lighting and ventilating apparatus of claim 13, wherein the lamp housing comprises a lip adjacent the portion of the lamp housing that extends beyond the first aperture of the main housing and the flange comprises a ridge, the lip capable of engaging the ridge to engage the flange and the lamp housing.

* * * * *